(12) United States Patent
Wang et al.

(10) Patent No.: US 9,866,727 B2
(45) Date of Patent: Jan. 9, 2018

(54) IMAGE CALIBRATION METHOD AND DEVICE

(71) Applicant: GRG Banking Equipment Co., Ltd., Guangzhou, Guangdong (CN)

(72) Inventors: Qianwen Wang, Guangdong (CN); Tiancai Liang, Guangdong (CN); Mengtao Liu, Guangdong (CN); Yifei Zhang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 38 days.

(21) Appl. No.: 14/917,238

(22) PCT Filed: Nov. 21, 2014

(86) PCT No.: PCT/CN2014/091874
§ 371 (c)(1),
(2) Date: Mar. 7, 2016

(87) PCT Pub. No.: WO2015/188592
PCT Pub. Date: Dec. 17, 2015

(65) Prior Publication Data
US 2016/0198066 A1    Jul. 7, 2016

(30) Foreign Application Priority Data
Jun. 13, 2014 (CN) .......................... 2014 1 0264151

(51) Int. Cl.
*G06K 9/00* (2006.01)
*H04N 1/409* (2006.01)
(Continued)

(52) U.S. Cl.
CPC ......... *H04N 1/409* (2013.01); *H04N 1/00045* (2013.01); *H04N 1/401* (2013.01); *H04N 1/4076* (2013.01); *H04N 5/235* (2013.01)

(58) Field of Classification Search
CPC ................................... G04N 1/00; G06T 7/00
(Continued)

(56) References Cited

U.S. PATENT DOCUMENTS

| 5,729,361 A | 3/1998 | Suggs et al. |
| 6,078,683 A | 6/2000 | Denison et al. |

(Continued)

FOREIGN PATENT DOCUMENTS

| CN | 101399921 A | 4/2009 |
| CN | 101399922 | 4/2009 |

(Continued)

OTHER PUBLICATIONS

International Search Report, dated Mar. 10, 2015, from corresponding International Application PCT/CN2014/091874.
(Continued)

*Primary Examiner* — Abolfazl Tabatabai
(74) *Attorney, Agent, or Firm* — Wolf, Greenfield & Sacks, P.C.

(57) ABSTRACT

An image calibration method and device. A deviation compensation coefficient of each pixel is calculated according to image data generated by strong and weak lighting parameters, and the deviation compensation coefficient is used to calibrate data of each image pixel collected and output by an image sensing unit. Therefore, the influence of inconsistency of each photosensitive element of the image sensing unit on the image greyscale can be eliminated, so that the effect of document medium image recognition is increased. The method in the embodiments of the present invention comprises: S1, acquiring a strong lighting parameter of each photosensitive element within a long exposure time and a weak lighting parameter thereof within a short exposure time; S2, acquiring image data of a sheet medium; and S3, according to the strong lighting parameter, the weak lighting parameter
(Continued)

parameter and the image data, calculating the calibrated image data of the sheet medium.

10 Claims, 3 Drawing Sheets

(51) Int. Cl.
  *H04N 5/235* (2006.01)
  *H04N 1/401* (2006.01)
  *H04N 1/407* (2006.01)
  *H04N 1/00* (2006.01)
  *G01D 18/00* (2006.01)

(58) Field of Classification Search
  USPC ........ 382/140, 274; 348/234, 239, 241, 362; 358/406, 504, 505, 509; 702/85, 104
  See application file for complete search history.

(56) References Cited

U.S. PATENT DOCUMENTS

| | | | |
|---|---|---|---|
| 6,552,829 B1 | 4/2003 | Maciey et al. | |
| 6,571,189 B2 * | 5/2003 | Jensen | H04N 1/407 250/208.1 |
| 7,348,974 B2 * | 3/2008 | Smith | A61N 5/1049 345/420 |
| 7,995,114 B2 * | 8/2011 | King | H04N 1/401 250/208.1 |
| 8,346,008 B2 * | 1/2013 | Lin | H04N 5/35509 348/241 |
| 2004/0047515 A1 | 3/2004 | Chiu | |
| 2006/0274961 A1 | 12/2006 | Chiu | |
| 2007/0070461 A1 | 3/2007 | Chiu | |
| 2009/0086061 A1 | 4/2009 | Asoma | |
| 2009/0086085 A1 | 4/2009 | Asoma | |
| 2009/0115724 A1 * | 5/2009 | Yamamoto | G06F 3/0346 345/158 |
| 2009/0153697 A1 | 6/2009 | King et al. | |
| 2010/0149384 A1 | 6/2010 | Iijima et al. | |
| 2011/0050965 A1 | 3/2011 | Uzumaki | |
| 2011/0181921 A1 | 7/2011 | Fukutome et al. | |
| 2012/0002082 A1 | 1/2012 | Johnson et al. | |

FOREIGN PATENT DOCUMENTS

| | | |
|---|---|---|
| CN | 101753779 A | 6/2010 |
| CN | 102143298 A | 8/2011 |
| CN | 103069454 | 4/2013 |
| CN | 103108107 A | 5/2013 |
| CN | 103152510 A | 6/2013 |
| CN | 103581563 | 2/2014 |
| CN | 103997590 | 8/2014 |
| JP | 2005204196 A | 7/2005 |

OTHER PUBLICATIONS

Patent Examination Report No. 1 for Australian Application No. 2014397243, dated Nov. 26, 2016.
Chinese Office Action, dated Mar. 25, 2016, from corresponding Chinese Application No. 201410264151.8.
Extended European Search Report for Application No. EP 14894715.3 dated Apr. 25, 2017.

* cited by examiner

IMAGE CALIBRATION METHOD AND DEVICE

CROSS-REFERENCE TO RELATED APPLICATIONS

The present application is the national phase of International Application No. PCT/CN2014/091874, titled "IMAGE CALIBRATION METHOD AND DEVICE", filed on Nov. 21, 2014, which claims priority to Chinese Patent Application No. 201410264151.8, titled "IMAGE CALIBRATION METHOD AND DEVICE", filed on Jun. 13, 2014 with the State Intellectual Property Office of the People's Republic of China, both of which applications are incorporated herein by reference in their entirety.

TECHNICAL FIELD

The present disclosure relates to the field of image processing, and in particular to a method and a device for image calibration.

BACKGROUND

In financial institutions or enterprises, scanning devices such as an optical image sensor are commonly used to scan sheet medium such as paper, banknote, check and so on, so as to generate image data of the sheet medium, and high-speed machine identification and processing are performed on the image data with information processing equipment such as CPU, thereby achieving informationized and efficient documents processing such as accounting and billing.

In scanning the sheet medium such as paper, banknote, check and so on with the scanning device such as an optical image sensor, since the image sensor is an array formed by jointing hundreds or even thousands of CMOS photosensitive elements made of silicon wafers, each of the photosensitive elements being a pixel and an amplifier being arranged at the location of the pixel, and electrical properties of the multiple photosensitive elements and the multiple amplification circuits are non-uniform, the various photosensitive elements and the various amplification circuits would output different voltages when the image sensor is scanning a piece of paper with uniform color and uniform brightness (i.e., the radiation input is uniform), so that values of image brightness generated in an image processing device are different and then regions with in-uniform brightness are formed in the image, which greatly influences quality of the image and in turn influences a result of the identification of the image.

In a calibration method commonly used nowadays, calibration is performed with some pieces of standard gray scale paper (gray scales of the standard gray scale paper are uniform), i.e., image data of the pieces of standard gray scale paper (the gray scales of the standard gray scale paper are uniform), generated by various photosensitive elements with same lighting parameters, are recorded, linear fitting is performed on actual gray values with the standard gray scale, and a gray scale calibration curve is obtained for each of the photosensitive elements.

In practice, for the pieces of standard gray scale paper, the standard gray scales can not be ensured to be uniform during manufacture, the gray scales may vary during use and storage, and the usage life is not long. In this case, the pieces of standard gray scale paper which are used as the reference for the calibration, are not standard, which leads to differences in calibration results; in addition, the pieces of the gray scale calibration paper can be used for limited times, usually needing to be replaced after being used for three to five times, which leads to a relatively high cost of calibration.

SUMMARY

A method and a device for image calibration are provided according to embodiments of the present disclosure, in which a deviation compensation coefficient is calculated for each pixel based on image data generated with high and low lighting parameters, and data of each image pixel collected and outputted by an image sensing unit is calibrated based on the deviation compensation coefficients, so that influence on gray scales of the image, caused due to nonuniformity of photosensitive elements of the image sensing unit, can be eliminated, thereby improving identification effect of an image of a document medium.

A method for image calibration is provided according to an embodiment of the present disclosure, which includes:

S1: obtaining, for each of photosensitive elements, a high lighting parameter corresponding to a long exposure time and a low lighting parameter corresponding to a short exposure time;

S2: obtaining image data of a sheet medium; and

S3: calculating calibrated image data of the sheet medium based on the high lighting parameter, the low lighting parameter and the image data.

Preferably, the step S1 includes:

S11: obtaining, for each of the photosensitive elements, the high lighting parameter corresponding to the long exposure time; and S12: obtaining, for each of the photosensitive elements, the low lighting parameter corresponding to the short exposure time;

or,

S11: obtaining, for each of the photosensitive elements, the low lighting parameter corresponding to the short exposure time; and S12: obtaining, for each of the photosensitive elements, the high lighting parameter corresponding to the long exposure time.

Preferably, the process of obtaining, for each of the photosensitive elements, the high lighting parameter corresponding to the long exposure time includes:

performing a long time exposure on a gray scale board for a period of tH;

recording image data IHi obtained through the long time exposure and a corresponding gray value GrayH; and storing the image data IHi and the gray value GrayH.

Preferably, the process of obtaining, for each of the photosensitive elements, the low lighting parameter corresponding to the short exposure time includes:

performing a short time exposure on the gray scale board for a period of tL;

recording image data ILi obtained through the short time exposure and a corresponding gray value GrayL; and storing the image data ILi and the gray value GrayL.

Preferably, the period tH is 60 us, and the gray value GrayH is 200; and the period Tl is 10 us, and the gray value GrayL is 20.

Preferably, the step S3 includes:

reading the image data IHi, the gray value GrayH, the image data ILi and the gray value GrayL; and denoting the image data obtained in the step S2 as Xi, and denoting the calibrated image data as Xi', then $$X_i'=GrayL+(GrayH-GrayL)*(X_i-IL_i)/(IH_i-IL_i)$$

Preferably, after the step S1 and before the step S3, the method further includes:

storing the high lighting parameter and the low lighting parameter.

A device for image calibration is provided according to an embodiment of the present disclosure, which includes:

a first obtaining unit, configured to obtain for each of photosensitive elements a high lighting parameter corresponding to a long exposure time and a low lighting parameter corresponding to a short exposure time;

a second obtaining unit, configured to obtain image data of a sheet medium; and a calculating unit, configured to calculate calibrated image data of the sheet medium based on the high lighting parameter, the low lighting parameter and the image data.

Preferably, the device further includes: a storing unit, configured to store the high lighting parameter and the low lighting parameter.

A device for image calibration is provided according to an embodiment of the present disclosure, which includes:

an image sensing unit, configured to collect image information of a medium;

a storing unit, configured to store the image information, and a controlling parameter and an image processing parameter of the image sensing unit; and a controlling and processing unit, configured to control a device for image calibration, calculate deviation compensation coefficients based on the controlling parameter and the image processing parameter, and calibrate data of each image pixel, collected and outputted by the image sensing unit, based on the deviation compensation coefficients.

According to the embodiments of the present disclosure, the high lighting parameter corresponding to the long exposure time and the low lighting parameter corresponding to the short exposure time are firstly obtained for each of the photosensitive elements; then the image data of the sheet medium is obtained; and finally, the calibrated image data of the sheet medium is calculated based on the high lighting parameter, the low lighting parameter and the image data. In the method and device according to the embodiments of the present disclosure, the deviation compensation coefficients are calculated for each of the pixels based on the image data generated with the high and low lighting parameters, and the data of each image pixel captured and outputted by the image sensing unit, is calibrated based on the deviation compensation coefficients, so that the influence on the gray scales of the image, caused due to the nonuniformity of the photosensitive elements in the image sensing unit, can be eliminated, thereby improving the identification effect of the image of the document medium.

DETAILED DESCRIPTION OF THE EMBODIMENTS

A method and a device for image calibration are provided according to embodiments of the present disclosure, in which a deviation compensation coefficient is calculated for each pixel based on image data generated with high and low lighting parameters, and data of each image pixel collected and outputted by an image sensing unit is calibrated based on the deviation compensation coefficients, so that influence on gray scales of the image, caused due to nonuniformity of photosensitive elements of the image sensing unit, can be eliminated, thereby improving identification effect of an image of a document medium.

Figure 1:
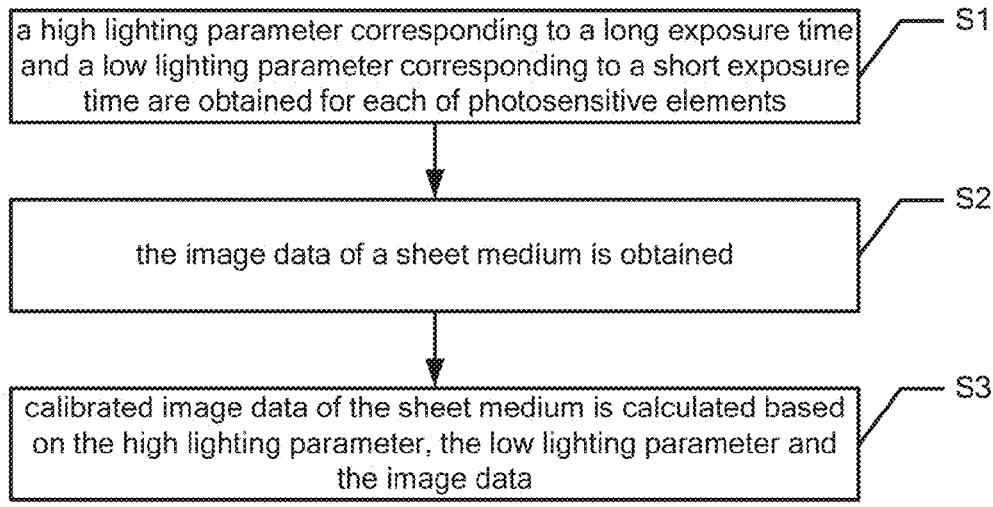
FIG. 1 is a flow chart of a method for image calibration according to a first embodiment of the present disclosure.

Reference is made to FIG. 1, a method for image calibration according to a first embodiment of the present disclosure includes the following steps S1 to S3.

In step S1, a high lighting parameter corresponding to a long exposure time and a low lighting parameter corresponding to a short exposure time are obtained for each of photosensitive elements.

Calibration coefficients for image data may be obtained based on the high lighting parameter and the low lighting parameter, thus the high lighting parameter corresponding to the long exposure time and the low lighting parameter corresponding to the short exposure time may be obtained for each of the photosensitive elements at first.

In step S2, the image data of a sheet medium is obtained.

After the high lighting parameter corresponding to the long exposure time and the low lighting parameter corresponding to the short exposure time are obtained for each of the photosensitive elements, the image data of the sheet medium may be obtained. The sheet medium is a sheet medium to be read by scanning.

In step S3, calibrated image data of the sheet medium is calculated based on the high lighting parameter, the low lighting parameter and the image data.

The calibration coefficients for the image data may be calculated based on the high lighting parameter, the low lighting parameter and the image data, the calibrated image data of the sheet medium may be calculated based on the calibration coefficients and the image data obtained in the step S2.

According to the embodiments of the present disclosure, the high lighting parameter corresponding to the long exposure time and the low lighting parameter corresponding to the short exposure time are firstly obtained for each of the photosensitive elements; then the image data of the sheet medium is obtained; and finally, the calibrated image data of the sheet medium is calculated based on the high lighting parameter, the low lighting parameter and the image data. In the method and device according to the embodiments of the present disclosure, the deviation compensation coefficients are calculated for each of the pixels based on the image data generated with the high and low lighting parameters, and the data of each image pixel captured and outputted by the image sensing unit, is calibrated based on the deviation compensation coefficients, so that the influence on the gray scales of the image, caused due to the nonuniformity of the photosensitive elements in the image sensing unit, can be eliminated, thereby improving the identification effect of the image of the document medium.

Figure 2:
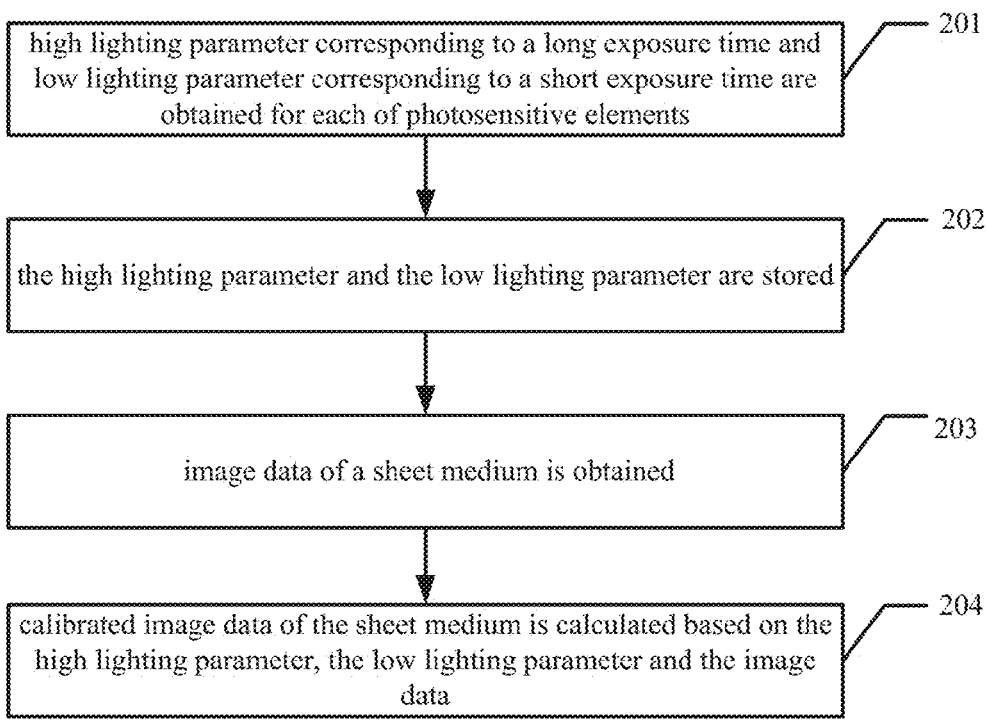
FIG. 2 is a flow chart of a method for image calibration according to a second embodiment of the present disclosure.

The method for image calibration according to the first embodiment of the present disclosure is briefly described above. A method for image calibration according to a second embodiment of the present disclosure is described in detail hereinafter. Reference is made to FIG. 2, the method for image calibration according to the second embodiment of the present disclosure includes the following steps 201 to 204.

In step 201, high lighting parameter corresponding to a long exposure time and low lighting parameter corresponding to a short exposure time are obtained for each of photosensitive elements.

Calibration coefficients for image data may be obtained based on the high lighting parameter and the low lighting parameter, thus the high lighting parameter corresponding to the long exposure time and the low lighting parameter corresponding to the short exposure time may be obtained for each of the photosensitive elements at first.

The process of obtaining, for each of photosensitive elements, the high lighting parameter corresponding to the long exposure time and the low lighting parameter corresponding to the short exposure time may include: obtaining for each of the photosensitive elements the high lighting parameter corresponding to the long exposure time; and obtaining for each of the photosensitive elements the low lighting parameter corresponding to the short exposure time. It should be noted that an order in which the high lighting parameter and the low lighting parameter are obtained is not limited and may be set based on actual requirements.

The process of obtaining for each of the photosensitive elements the high lighting parameter corresponding to the long exposure time includes: performing a long time exposure on a gray scale board for a period of tH; recording, image data IHi obtained through the long time exposure and a corresponding gray value GrayH; and storing the image data IHi and the gray value GrayH. The period tH may be 60 us, and the gray value GrayH may be 200.

The process of obtaining for each of the photosensitive elements the low lighting parameter corresponding to the short exposure time includes: performing a short time exposure on the gray scale board for a period of tL; recording, image data ILi obtained through the short time exposure and a corresponding gray value GrayL; and storing the image data ILi and the gray value GrayL. The period tL may be 10 us, and the gray value GrayL may be 20.

The process of obtaining for each of the photosensitive elements the low lighting parameter corresponding to the short exposure time includes: performing a short time exposure on the gray scale board for a period of tL; recording, image data ILi obtained through the short time exposure and a corresponding gray value GrayL; and storing the image data ILi and the gray value GrayL. The image data ILi may be 10 us, and the gray value GrayL may be 20.

In step 202, the high lighting parameter and the low lighting parameter are stored.

After the step 201 is performed, the obtained high lighting parameter and the obtained low lighting parameter may be stored.

In step 203, image data of a sheet medium is obtained.

After the high lighting parameter corresponding to the long exposure time and the low lighting parameter corresponding to the short exposure time obtained for each of the photosensitive elements are stored, the image data of the sheet medium may be obtained. The above sheet medium is a sheet medium to be read by scanning.

In step 204, calibrated image data of the sheet medium is calculated based on the high lighting parameter, the low lighting parameter and the image data.

The calibration coefficients of the image data may be calculated based on the high lighting parameter, the low lighting parameter and the image data, and the calibrated image data of the sheet medium may be calculated based on the calibration coefficients and the image data obtained in the step 203.

The step 204 may include: reading the image data IHi, the gray value GrayH, the image data ILi and the gray value GrayL; and denoting the image data obtained in the step 203 as Xi, and denoting the calibrated image data as Xi', then $X_i' = GrayL + (GrayH - GrayL)*(X_i - IL_i)/(IH_i - IL_i)$ Based on the above formula, the calibrated image data Xi' of sheet medium may be obtained.

According to the embodiment of the present disclosure, the high lighting parameter corresponding to the long exposure time and the low lighting parameter corresponding to the short exposure time are firstly obtained for each of the photosensitive elements; then the image data of the sheet medium is obtained; and finally, the calibrated image data of the sheet medium is calculated based on the high lighting parameter, the low lighting parameter and the image data. In the method for image calibration according to the embodiment of the present disclosure, the deviation compensation coefficients are calculated for each of pixels based on the pieces of image data generated with the high and low lighting parameters, and the data of each image pixel, captured and outputted by an image sensing unit, is calibrated based on the deviation compensation coefficients, so that influence on gray scales of the image, caused due to nonuniformity of the photosensitive elements in the image sensing unit, can be eliminated, thereby improving identification effect of the image of the document medium.

Figure 3:
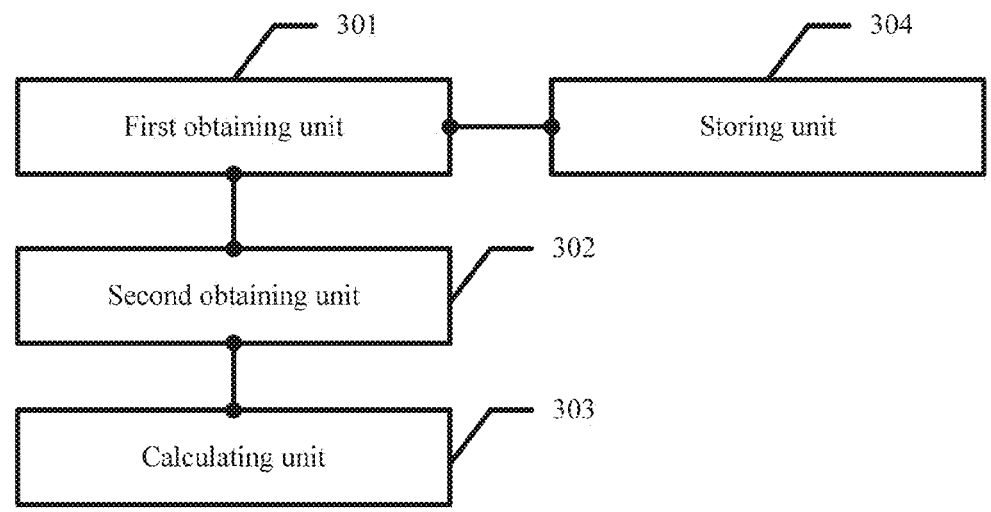
FIG. 3 is a schematic structural diagram of a device for image calibration according to a first embodiment of the present disclosure.

The method for image calibration according to the second embodiment of the present disclosure is described in detail above in particular for the process. A device for image calibration according to a first embodiment of the present disclosure is described hereinafter. Reference is made to FIG. 3, the device for image calibration according to the first embodiment of the present disclosure includes:

a first obtaining unit 301, configured to obtain for each of photosensitive elements high lighting parameter corresponding to a long exposure time and low lighting parameter corresponding to a short exposure time;

a second obtaining unit 302, configured to obtain image data of a sheet medium; and a calculating unit 303, configured to calculate calibrated image data of the sheet medium based on the high lighting parameter, the low lighting parameter and the image data.

Preferably, the device further includes: a storing unit 304, configured to store the high lighting parameter and the low lighting parameter.

The first embodiment of the device for image calibration according to the present disclosure corresponds to the first embodiment and the second embodiment of the method for image calibration according to the present disclosure, thus features possessed by the first embodiment and the second embodiment of the method for image calibration according to the present disclosure are also possessed by the first embodiment of the device for image calibration according to the present disclosure, which are not described herein.

The deviation compensation coefficients are calculated for each of pixels based on image data generated with the high and low lighting parameters, and the data of each image pixel, captured and outputted by an image sensing unit, is calibrated based on the deviation compensation coefficients, so that the device for image calibration according to the embodiment of the present disclosure can eliminate the influence on gray scales of the image, caused due to nonuniformity of photosensitive elements of the image sensing unit, thereby improving identification effect of the image of the document medium.

Figure 4:
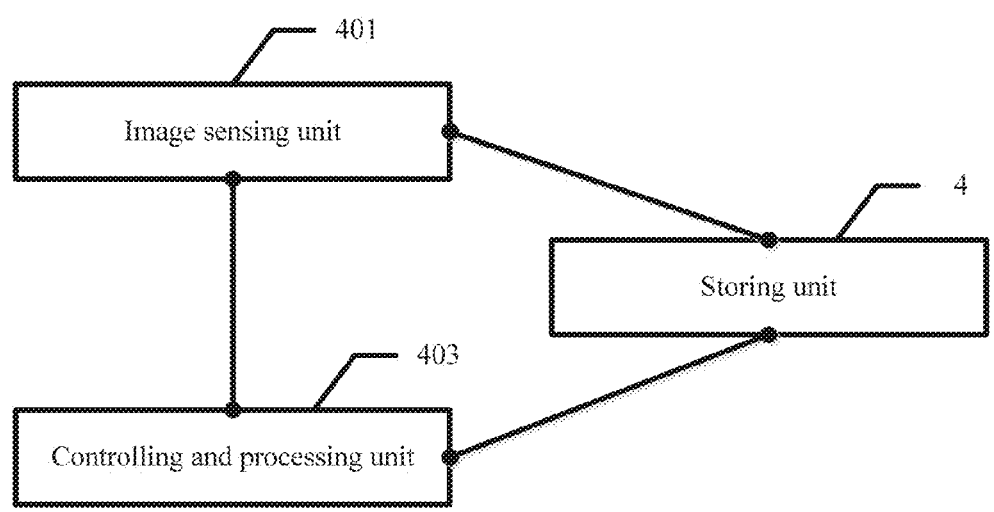
FIG. 4 is a schematic structural diagram of a device for image calibration according to a second embodiment of the present disclosure.

The device for image calibration according to the first embodiment of the present disclosure is described in detail above in particular for the process. A device for image calibration according to a second embodiment of the present disclosure is described hereinafter. References are made to FIG. 4 to FIG. 6, the device for image calibration according to the second embodiment of the present disclosure includes:

an image sensing unit 401, configured to collect image information of a medium;

a storing unit 402, configured to store the image information, and a controlling parameter and an image processing parameter of the image sensing unit; and a controlling and processing unit 403, configured to control a device for image calibration, calculate deviation compensation coefficients based on the controlling parameter and the image processing parameter, and calibrate data of each image pixel, collected and outputted by the image sensing unit, based on the deviation compensation coefficients.

According to the embodiment of the present disclosure, the image sensing unit 401 collects reference image data based on the controlling parameter, such as the high lighting parameter and the low lighting parameter, and collects the image information of the medium; then the reference image data and the image processing parameter may be stored by the storing unit 402 for subsequent use; and finally, the deviation compensation coefficients are calculated by the controlling and processing unit 403 based on the controlling parameter and the image processing parameter, and the data of each image pixel, collected and outputted by the image sensing unit, is calibrated based on the deviation compensation coefficients.

The following embodiment is provided, to illustrate the operating process of components according to the embodiments of the present disclosure.

Figure 5:
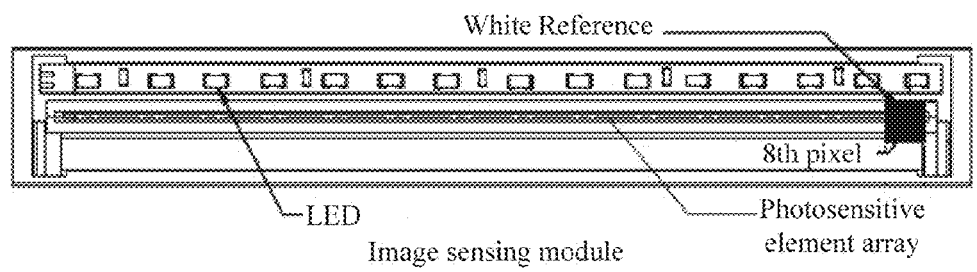
FIG. 5 is a schematic structural diagram of an image sensing unit according to embodiments of a device for image calibration of the present disclosure.
Figure 6:
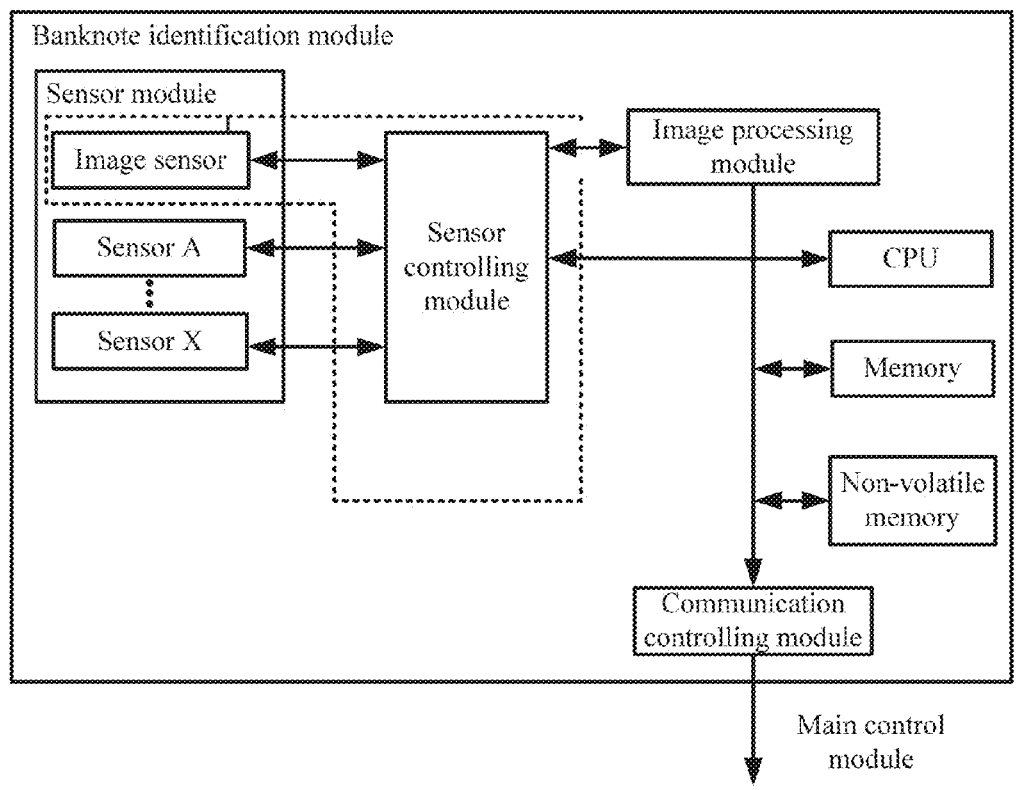
FIG. 6 is a schematic structural diagram of applying a device for image calibration in banknote identification according to the disclosure.

Reference is made to FIG. 5. During banknote identification, a banknote identification device may include a sensor module, a sensor controlling module, an image processing module, a CPU, a memory and a communication controlling module, where the sensor module includes several sensors configured to collect data of a banknote; the sensor controlling module is configured to control the above image sensors, and send the collected data to the image processing module for processing; the image processing module is configured to process the collected data of the banknote, and the processing in the embodiment of the present disclosure refers to calibrating the data of the banknote; the data of the banknote described above and calibrated data of the banknote may be stored in the memory such as a nonvolatile memory; and the banknote identification device may be connected to a main control module via the communication controlling module, so as to facilitate the main control module to call the data in the memory. Reference is made to FIG. 6 for the above sensor module.

In the method for image calibration according to the embodiment of the present disclosure, the deviation compensation coefficients are calculated for each of the pixels based on the image data generated with the high and low lighting parameters, and the data of each image pixel, captured and outputted by the image sensing unit, is calibrated based on the deviation compensation coefficients, so that influence on gray scales of the image, caused due to nonuniformity of photosensitive elements of the image sensing unit, can be eliminated, thereby improving identification effect of the image of the document medium.

It should be understood by those skilled in the art that all or some of the steps in the method according to the above embodiments may be implemented by instructing related hardware with a program. The program may be stored in a computer readable storage medium. The above storage medium may be a read-only memory, a magnetic disk or an optical disk.

The method and the device for image calibration according to the present disclosure are described above in details. For those skilled in the art, implementations and the application scope may be changed based on the spirit of the embodiments of the present disclosure. In conclusion, content of the present disclosure is not to be interpreted as limitations to the present disclosure.

The invention claimed is:

1. A method for image calibration comprising:
   S1: obtaining, by a processor, for each of photosensitive elements in a sensor, a high lighting parameter corresponding to a long exposure time and a low lighting parameter corresponding to a short exposure time;
   S2: obtaining, by the processor, image data of a sheet medium; and
   S3: calculating, by the processor, calibrated image data of the sheet medium based on the high lighting parameter, the low lighting parameter and the image data;
   wherein the process of obtaining, by the processor, for each of the photosensitive elements in the sensor, the high lighting parameter corresponding to the long exposure time comprises:
   performing a long time exposure on a gray scale board for a period of tH; and
   recording image data IHi obtained through the long time exposure and a corresponding gray value GrayH.

2. The method for image calibration according to claim 1, wherein the step S1 comprises:
   S11: obtaining, for each of the photosensitive elements, the high lighting parameter corresponding to the long exposure time; and
   S12: obtaining, for each of the photosensitive elements, the low lighting parameter corresponding to the short exposure time;
   or,
   S11: obtaining, for each of the photosensitive elements, the low lighting parameter corresponding to the short exposure time; and
   S12: obtaining, for each of the photosensitive elements, the high lighting parameter corresponding to the long exposure time.

3. The method for image calibration according to claim 2, wherein the process of obtaining, by the processor, for each of the photosensitive elements in the sensor, the high lighting parameter corresponding to the long exposure time comprises:
   storing the image data IHi and the gray value GrayH.

4. The method for image calibration according to claim 3, wherein the process of obtaining, by the processor, for each of the photosensitive elements in the sensor, the low lighting parameter corresponding to the short exposure time comprises:
   performing a short time exposure on the gray scale board for a period of tL;

recording image data ILi obtained through the short time exposure and a corresponding gray value GrayL; and storing the image data ILi and the gray value GrayL.

5. The method for image calibration according to claim 4, wherein:

the period tH is 60 us, and the gray value GrayH is 200; and the period tL is 10 us, and the gray value GrayL is 20.

6. The method for image calibration according to claim 5, wherein the step S3 comprises:

reading the image data IHi, the gray value GrayH, the image data ILi and the gray value GrayL; and calculating the calibrated image data based on the following formula:

$$X_i' = GrayL + (GrayH - GrayL) * (X_i - IL_i) / (IH_i - IL_i)$$

wherein Xi is the image data obtained in the step S2, and Xi' is the calibrated image data.

7. The method for image calibration according to claim 4, wherein the step S3 comprises:

reading the image data IHi, the gray value GrayH, the image data ILi and the gray value GrayL; and calculating the calibrated image data based on the following formula:

$$X_i' = GrayL + (GrayH - GrayL) * (X_i - IL_i) / (IH_i - IL_i)$$

wherein Xi is the image data obtained in the step S2, and Xi' is the calibrated image data.

8. The method for image calibration according to claim 1, wherein after the step S1 and before the step S3, the method further comprises:

storing, by the processor, the high lighting parameter and the low lighting parameter.

9. A device for image calibration comprising a processor and a memory having processor-executable instructions stored therein, wherein the instructions, when executed by the processor, configure the processor to:

obtain, for each of photosensitive elements in a sensor, a high lighting parameter corresponding to a long exposure time and a low lighting parameter corresponding to a short exposure time;

obtain image data of a sheet medium; and calculate calibrated image data of the sheet medium based on the high lighting parameter, the low lighting parameter and the image data;

where obtaining, for each of the photosensitive elements in the sensor, the high lighting parameter corresponding to the long exposure time comprises:

performing a long time exposure on a gray scale board for a period of tH; and recording image data IHi obtained through the long time exposure and a corresponding gray value GrayH.

10. The device for image calibration according to claim 9, wherein the instructions further configure the processor to:

store the high lighting parameter and the low lighting parameter.

* * * * *